(12) United States Patent
Shimada

(10) Patent No.: US 9,860,398 B2
(45) Date of Patent: Jan. 2, 2018

(54) INFORMATION PROCESSING APPARATUS THAT CREATES OTHER DOCUMENTS FROM READ DOCUMENT

(71) Applicant: KYOCERA Document Solutions Inc., Osaka (JP)

(72) Inventor: Akira Shimada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/168,074

(22) Filed: May 29, 2016

(65) Prior Publication Data

US 2016/0352934 A1 Dec. 1, 2016

(30) Foreign Application Priority Data

May 29, 2015 (JP) .................................. 2015-110257

(51) Int. Cl.
| | | |
|---|---|---|
| *H04N 1/46* | (2006.01) | |
| *H04N 1/387* | (2006.01) | |
| *H04N 1/00* | (2006.01) | |
| *G06K 9/00* | (2006.01) | |
| *G06K 9/20* | (2006.01) | |

(52) U.S. Cl.
CPC ..... *H04N 1/00336* (2013.01); *G06K 9/00469* (2013.01); *G06K 9/2081* (2013.01); *H04N 1/00167* (2013.01)

(58) Field of Classification Search
None
See application file for complete search history.

(56) References Cited

U.S. PATENT DOCUMENTS

| | | | | |
|---|---|---|---|---|
| 5,407,357 A | * | 4/1995 | Cutler .................... | G09B 5/062 434/308 |
| 5,519,433 A | * | 5/1996 | Lappington ............. | A63F 13/12 348/478 |
| 5,724,357 A | * | 3/1998 | Derks ................... | G06F 15/025 340/10.32 |
| 6,112,049 A | * | 8/2000 | Sonnenfeld ............. | G09B 5/14 434/118 |
| 6,287,123 B1 | * | 9/2001 | O'Brien ................... | G09B 7/02 434/118 |

(Continued)

FOREIGN PATENT DOCUMENTS

JP 2007-004523 A 1/2007

*Primary Examiner* — Madelein Nguyen
(74) *Attorney, Agent, or Firm* — Hawaii Patent Services; Nathaniel K. Fedde; Kenton N. Fedde

(57) ABSTRACT

An information processing apparatus is provided capable of creating images of a plurality of question sentences and answer columns from a document. A document reading unit reads a document to which marking has been applied by a plurality of different patterns and acquires document image data. A marking pattern detection unit recognizes in each different pattern the marking in a marking region to which the marking of the document image data has been applied and detects a pattern of the marking. A question sentence creation unit creates, in each different pattern, question sentence image data in which partial image data in the marking region is deleted from the document image data. An output unit outputs the question sentence image data created by the question sentence creation unit.

5 Claims, 7 Drawing Sheets

(56) References Cited

U.S. PATENT DOCUMENTS

| | | | | |
|---|---|---|---|---|
| 6,471,521 B1* | 10/2002 | Dornbush | | G09B 5/14 |
| | | | | 434/322 |
| 6,665,640 B1* | 12/2003 | Bennett | | G06F 17/3043 |
| | | | | 704/257 |
| 6,760,748 B1* | 7/2004 | Hakim | | G09B 5/14 |
| | | | | 434/350 |
| 8,814,359 B1* | 8/2014 | Pompilio, III | | A61B 3/02 |
| | | | | 351/203 |
| 9,161,066 B1* | 10/2015 | Oztaskent | | H04N 21/24 |
| 9,519,766 B1* | 12/2016 | Bhosale | | G06F 21/31 |
| 9,615,142 B2* | 4/2017 | Abecassis | | H04N 21/8133 |
| 2002/0120504 A1* | 8/2002 | Gould | | G06Q 30/02 |
| | | | | 705/14.2 |
| 2003/0195807 A1* | 10/2003 | Maggio | | G06Q 30/02 |
| | | | | 705/14.35 |
| 2005/0026130 A1* | 2/2005 | Crowhurst | | G09B 5/06 |
| | | | | 434/362 |
| 2006/0053357 A1* | 3/2006 | Rajski | | G01R 31/01 |
| | | | | 714/742 |
| 2006/0216683 A1* | 9/2006 | Goradia | | G09B 7/02 |
| | | | | 434/322 |
| 2006/0271526 A1* | 11/2006 | Charnock | | G06Q 30/02 |
| 2007/0031802 A1* | 2/2007 | Koyama | | G09B 7/06 |
| | | | | 434/323 |
| 2007/0269775 A1* | 11/2007 | Andreev | | G09B 7/00 |
| | | | | 434/156 |
| 2009/0226872 A1* | 9/2009 | Gunther | | G09B 7/00 |
| | | | | 434/350 |
| 2011/0208822 A1* | 8/2011 | Rathod | | G06Q 30/02 |
| | | | | 709/206 |
| 2012/0317174 A1* | 12/2012 | Miller | | G06Q 10/06 |
| | | | | 709/203 |
| 2014/0075004 A1* | 3/2014 | Van Dusen | | H04L 41/04 |
| | | | | 709/223 |
| 2014/0181854 A1* | 6/2014 | Finkelstein | | H04N 21/4758 |
| | | | | 725/24 |
| 2015/0050635 A1* | 2/2015 | Hong | | G09B 7/06 |
| | | | | 434/353 |
| 2015/0170325 A1* | 6/2015 | Abecassis | | G06T 1/20 |
| | | | | 345/2.1 |
| 2015/0199400 A1* | 7/2015 | Wu | | G09B 7/02 |
| | | | | 434/353 |
| 2016/0269786 A1* | 9/2016 | Lee | | H04N 21/435 |
| 2016/0293034 A1* | 10/2016 | Agarwalla | | G06N 99/005 |
| 2017/0105666 A1* | 4/2017 | Lee | | A61B 5/16 |
| 2017/0109473 A1* | 4/2017 | Kulon | | G06F 19/322 |
| 2017/0214701 A1* | 7/2017 | Hasan | | H04L 63/1408 |
| 2017/0235848 A1* | 8/2017 | Van Dusen | | G06F 17/30979 |
| | | | | 705/12 |

* cited by examiner

INFORMATION PROCESSING APPARATUS THAT CREATES OTHER DOCUMENTS FROM READ DOCUMENT

INCORPORATION BY REFERENCE

This application is based on and claims the benefit of priority from Japanese Patent Application No. 2015-110257 filed on May 29, 2015, the contents of which are hereby incorporated by reference.

BACKGROUND

The present disclosure relates to an information processing apparatus that creates other documents from a read document.

An information processing apparatus such as a printer, a multifunction printer, a multifunctional peripheral device, or a multifunction peripheral reads a paper document and creates images of the read paper document by an OCR (referred to as "optical character recognition") function or the like. Thereby, even in the paper document, an edit is easily performed, such as a particular character string of the document is replaced with another character string, or writing of another document is added to writing of the document. In a typical question sheet preparing device and question sheet preparing method, for example, an image of a question document is read in which a character string as an answer to a question is specified by marking and the character string specified by the marking is extracted from image data of the read question document, thereby creating electronic data of an answer document. Further, the character string specified by the marking is erased and an answer column is set, thereby creating the electronic data of a question sentence. Then, question sheets and answer sheets are prepared by printing the above electronic data on sheets.

SUMMARY

An information processing apparatus of the present disclosure is characterized by including a document reading unit that reads a document to which marking has been applied by a plurality of different patterns and acquires document image data, a marking pattern detection unit that recognizes, in each different pattern, the marking in a marking region to which the marking of the document image data has been applied and detects a pattern of the marking, a question sentence creation unit that creates, in each different pattern, question sentence image data in which partial image data in the marking region is deleted from the document image data, and an output unit that outputs the question sentence image data created by the question sentence creation unit.

DETAILED DESCRIPTION

Hereinafter, a first embodiment (hereinafter, referred to as an "embodiment 1") for embodying the present disclosure will be described with reference to the accompanying drawings. In the embodiment 1, question sentences and answer columns having two patterns are created from images of a document in which part of a region is marked by colors, frames, or underlines of two kinds (hereinafter, referred to as a "pattern") of highlight pens. Further, the created question sentences and answer columns are used to perform a test, a plurality of answer sheets are read in which the answer columns are filled out, and the question sentences and answer columns are re-created in which only the questions are collected in which a correct answer rate for each calculated question is equal to or less than a reference value that is decided in advance.

Figure 1:
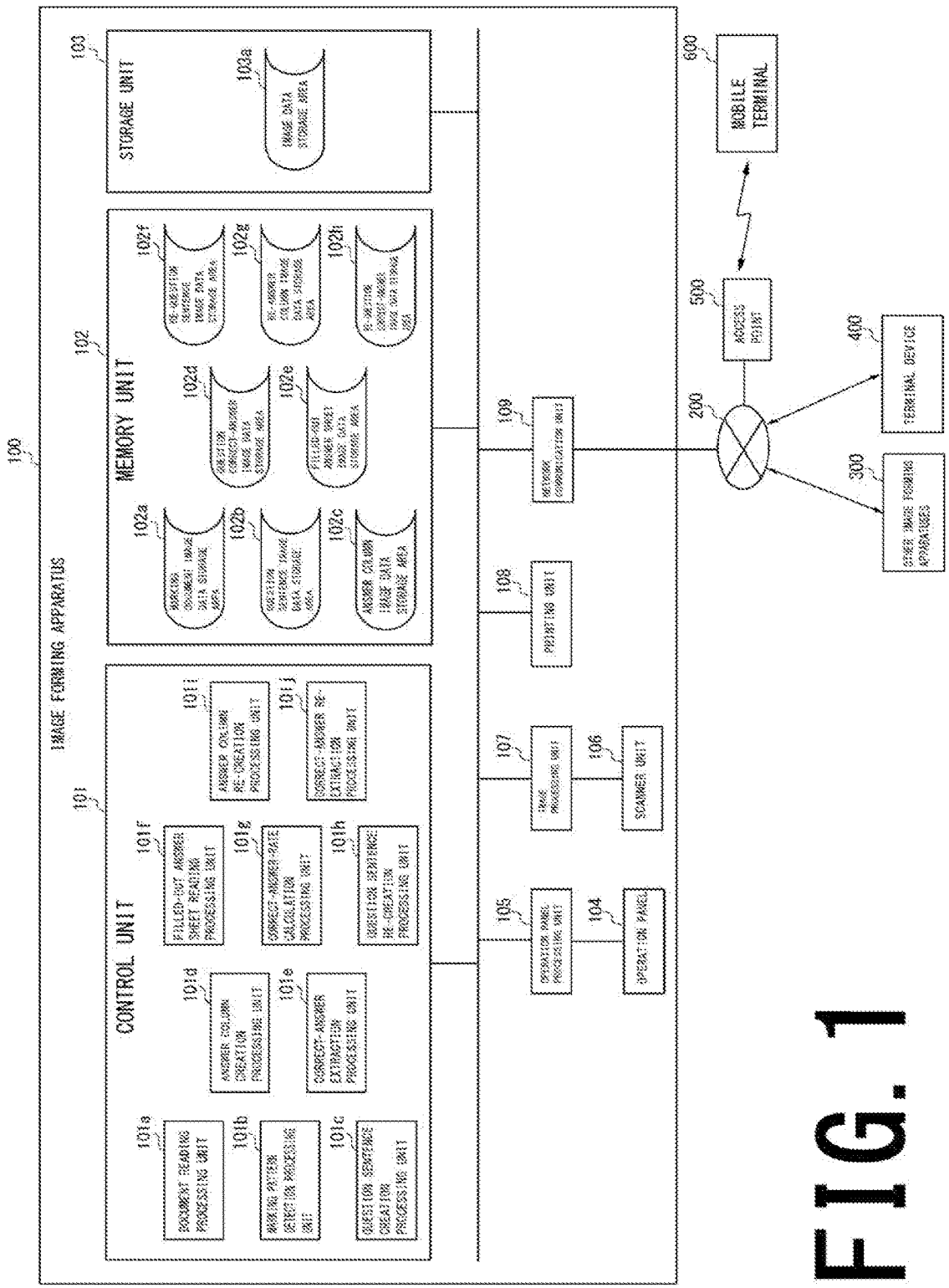
FIG. 1 is a block diagram illustrating a functional configuration of an image forming apparatus according to a first embodiment of the present disclosure.

First, a functional configuration of an image forming apparatus 100 that is an information processing apparatus according to the embodiment 1 will be described with reference to FIG. 1. As illustrated in FIG. 1, the image forming apparatus 100 includes a control unit 101, a memory unit 102, a storage unit 103, an operation panel 104, an operation panel processing unit 105, a scanner unit 106, an image processing unit 107, a printing unit 108, and a network communication unit 109. The image forming apparatus 100 has a configuration in which each unit of the above is connected to each other through a bus etc. Further, the control unit 101 is provided with a document reading processing unit 101a, a marking pattern detection processing unit 101b, a question sentence creation processing unit 101c, an answer column creation processing unit 101d, a correct-answer extraction processing unit 101e, a filled-out answer sheet reading processing unit 101f, a correct-answer-rate calculation processing unit 101g, a question sentence re-creation processing unit 101h, an answer column re-creation processing unit 101i, and a correct-answer re-extraction processing unit 101j. Further, the memory unit 102 is provided with a marking document image data storage area 102a, a question sentence image data storage area 102b, an answer column image data storage area 102c, a question correct-answer image data storage area 102d, a filled-out answer sheet image data storage area 102e, a re-question sentence image data storage area 102f, a re-answer column image data storage area 102g, and a re-question correct-answer image data storage area 102h. The storage unit 103 is provided with an image data storage area 103a.

The control unit 101 has a main storage means such as a RAM and a ROM, and a control means such as an MPU (Micro Processing Unit) and a CPU (Central Processing Unit). Further, the control unit 101 performs overall control of the image forming apparatus 100 including a bus controller and an interface such as various I/Os and a USB (universal serial bus).

The document reading processing unit 101*a* reads a document (hereinafter, referred to as a "marking document") to which marking has been applied by a plurality of different patterns and acquires image data of the marking document.

The marking pattern detection processing unit 101*b* recognizes, in each different pattern, the marking in a marking region to which the marking of the image data of the marking document has been applied, and detects patterns of the marking.

The question sentence creation processing unit 101*c* creates, in each different pattern in the marking region, the image data of a question sentence in which the image data of a part (hereinafter, referred to as "partial image data") in the marking region is deleted from the image data of the marking document.

The answer column creation processing unit 101*d* creates image data of answer columns of questions that are provided with the answer columns of the questions of the image data in the question sentence.

The correct-answer extraction processing unit 101*e* extracts the partial image data in the marking region from the image data of the marking document as the image data of correct answers (hereinafter, referred to as "correct-answer image data") of the questions in the question sentence.

The filled-out answer sheet reading processing unit 101*f* reads a filled-out answer sheet in which answers are filled out, and acquires the image data of the filled-out answer sheet.

The correct-answer-rate calculation processing unit 101*g* determines whether answers of the image data in the filled-out answer sheet are correct based on the correct-answer image data, and calculates a correct answer rate for each question of the question sentence.

The question sentence re-creation processing unit 101*h* takes out, from the image data of the question sentence, the image data of a part of the question sentence (hereinafter, referred to as "partial question sentence image data") in which the correct answer rate is equal to or less than the reference value that is decided in advance, and creates re-question sentence image data.

The answer column re-creation processing unit 101*i* creates the image data of the answer columns to re-questions that are provided with the answer columns to the re-questions of the re-question sentence image data.

The correct-answer re-extraction processing unit 101*j* extracts correct-answer image data to the questions of the re-question sentence from the correct-answer image data.

The memory unit 102 is an auxiliary storage device constituted by a flash memory etc., and stores programs or data for a process that is executed by the control unit 101.

The marking document image data storage area 102*a* stores marking documents.

The question sentence image data storage area 102*b* stores image data of the created question sentences.

The answer column image data storage area 102*c* stores image data of the created answer columns.

The question correct-answer image data storage area 102*d* stores the correct-answer image data to the questions of the created question sentences.

The filled-out answer sheet image data storage area 102*e* stores image data of the filled-out answer sheet in which answer columns are filled out.

The re-question sentence image data storage area 102*f* stores image data of the re-created question sentences.

The re-answer column image data storage area 102*g* stores image data of the re-created answer columns.

The re-question correct-answer image data storage area 102*h* stores the correct-answer image data to the questions of the re-created question sentences.

The storage unit 103 is a hard disk drive that saves data or programs.

The image data storage area 103*a* stores image data that has been read by the scanner unit 106 and has been processed by the image processing unit 107, image data that has been received from a PC (personal computer) 100 or a mobile terminal 600 via the network communication unit 109, or the like.

The operation panel 104 is a liquid crystal panel that displays operation items and various information and accepts an operation by a user.

The operation panel processing unit 105 inputs a process in which operation items for functions of the image forming apparatus 100 are displayed on the operation panel 104, a process in which various information or image data of the image forming apparatus 100 is displayed, or operations of the user from the operation panel 104.

The scanner unit 106 outputs document image data of the read documents to the image processing unit 107 through a read operation of documents from the operation panel 104 by the user.

When the document image data read by the scanner unit 106 is input, the image processing unit 107 performs a process to convert the document image data into image data processible by the image forming apparatus 100.

The printing unit 108 prints image data, whose printing has been required, on a sheet.

The network communication unit 109 includes a detachable LAN interface and connects the image forming apparatus 100 to a network 200. The image forming apparatus 100 transmits and receives data to and from other image forming apparatuses 300, terminal devices 400 such as a PC connected to the network 200, or mobile terminals 600 connected to the network 200 from an access point 500.

Subsequently, a procedure to create question sentences and answer columns having two patterns from one document will be described with reference to FIG. 2.

Figure 2:
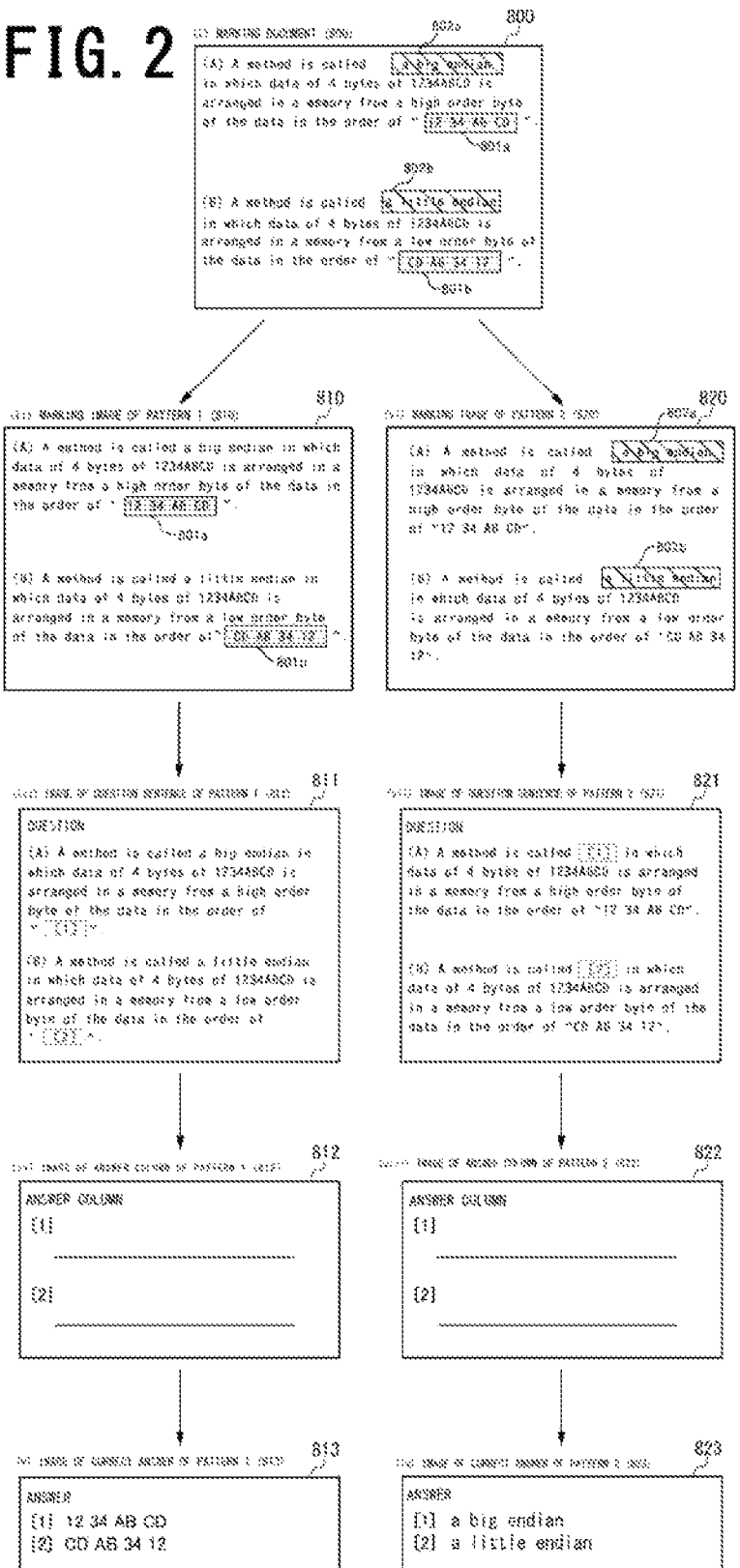
FIG. 2 is a flowchart illustrating a procedure to create a question sentence and answer column having two patterns from one document according to the first embodiment of the present disclosure.

First, as illustrated in FIG. 2 (i), the user creates a marking document 800 in which marking of pattern 1 has been applied to character strings 801*a* and 801*b* and marking of pattern 2 has been applied to character strings 802*a* and 802*b*. Next, when the user sets the marking document 800 on a document platen and performs an operation to create question sentences and answer columns, the marking document 800 is read.

Next, a marking image (hereinafter, referred to as a "marking image of pattern 1") 810 illustrated in FIG. 2 (ii) in which there is only the marking of pattern 1 is created from the read marking document 800. Next, an image 811 of the question sentences of pattern 1 illustrated in FIG. 2 (iii) is created in which the character strings 801*a* and 801*b* are deleted from the marking image 810 of pattern 1 and the numbers [1] and [2] of the questions are added to blank areas of the deleted character strings. Next, an image 812 of answer columns of pattern 1 illustrated in FIG. 2 (iv) is created in which there are the answer columns to the numbers [1] and [2] of the added questions. Next, an image 813 of correct answers of pattern 1 illustrated in FIG. 2 (v) is created based on the character strings 801*a* and 801*b* deleted from the marking image 810 of pattern 1.

Next, a marking image (hereinafter, referred to as a "marking image of pattern 2") 820 illustrated in FIG. 2 (vi) in which there is only the marking of pattern 2 is created from the read marking document 800. Next, an image 821 of question sentences of pattern 2 illustrated in FIG. 2 (vii) is created in which the character strings 802*a* and 802*b* are deleted from the marking image 820 of pattern 2 and the numbers [1] and [2] of the questions are added to blank areas of the deleted character strings. Next, an image 822 of answer columns of pattern 2 illustrated in FIG. 2 (viii) is created in which there are the answer columns to the numbers [1] and [2] of the added questions. Next, an image 823 of correct answers of pattern 2 illustrated in FIG. 2 (ix) is created based on the character strings 802*a* and 802*b* deleted from the marking image 820 of pattern 2.

Subsequently, a procedure will be described with reference to FIGS. 2 and 3 in which the question sentences and answer columns of pattern 1 created by the procedure of FIG. 2 are used to perform a test and the question sentences and answer columns of the question are re-created in which the correct answer rates are equal to or less than the reference value that is decided in advance.

First, when the user sets on the document platen a plurality of answer sheets (hereinafter, referred to as a "filled-out answer sheet of pattern 1") 814 of pattern 1 in which the answer columns illustrated in FIG. 3 (i) are filled out and performs an operation to re-create the question sentences and answer columns, the plurality of the filled-out answer sheets 814 of pattern 1 are read. Subsequently, the character strings 801*c* and 801*d* whose answer columns are written by hand are taken out from the plurality of the read filled-out answer sheets 814 of pattern 1, and the correct answer rates [1] and [2] of correct answer rate data 815 of pattern 1 illustrated in FIG. 3 (ii) are calculated based on the answers [1] and [2] of the image 813 of correct answers of pattern 1 illustrated in FIG. 2 (v). For example, when the number of persons that take a test is 40 persons, that of persons that give the correct answer to the question [1] is 30 persons, and that of persons that give the correct answer to the question [2] is 10 persons, a correct answer rate to the question [1] is 75%, and that to the question [2] is 25%. Next, only the questions whose correct answer rate is equal to or less than the reference value are taken out from the image 811 of the question sentences of pattern 1 illustrated in FIG. 2 (iii). For example, when the reference value is 50%, only the question (B) whose correct answer rate is 25% is taken out from the image 811 of the question sentences of pattern 1 illustrated in FIG. 2 (iii). Next, an image 816 of question sentence to re-question of pattern 1 illustrated in FIG. 3 (iii) is created to which the number (a) of the question is added. Next, an image 817 of answer column to re-question of pattern 1 illustrated in FIG. 3 (iv) is created in which there is the answer column of the number (a) of the added question. Next, the answer [2] to the question (B) is taken out from the answer data of pattern 1 illustrated in FIG. 2 (v), while an image 818 of correct answer to re-question of pattern 1 illustrated in FIG. 3 (v) is created.

Figure 4:
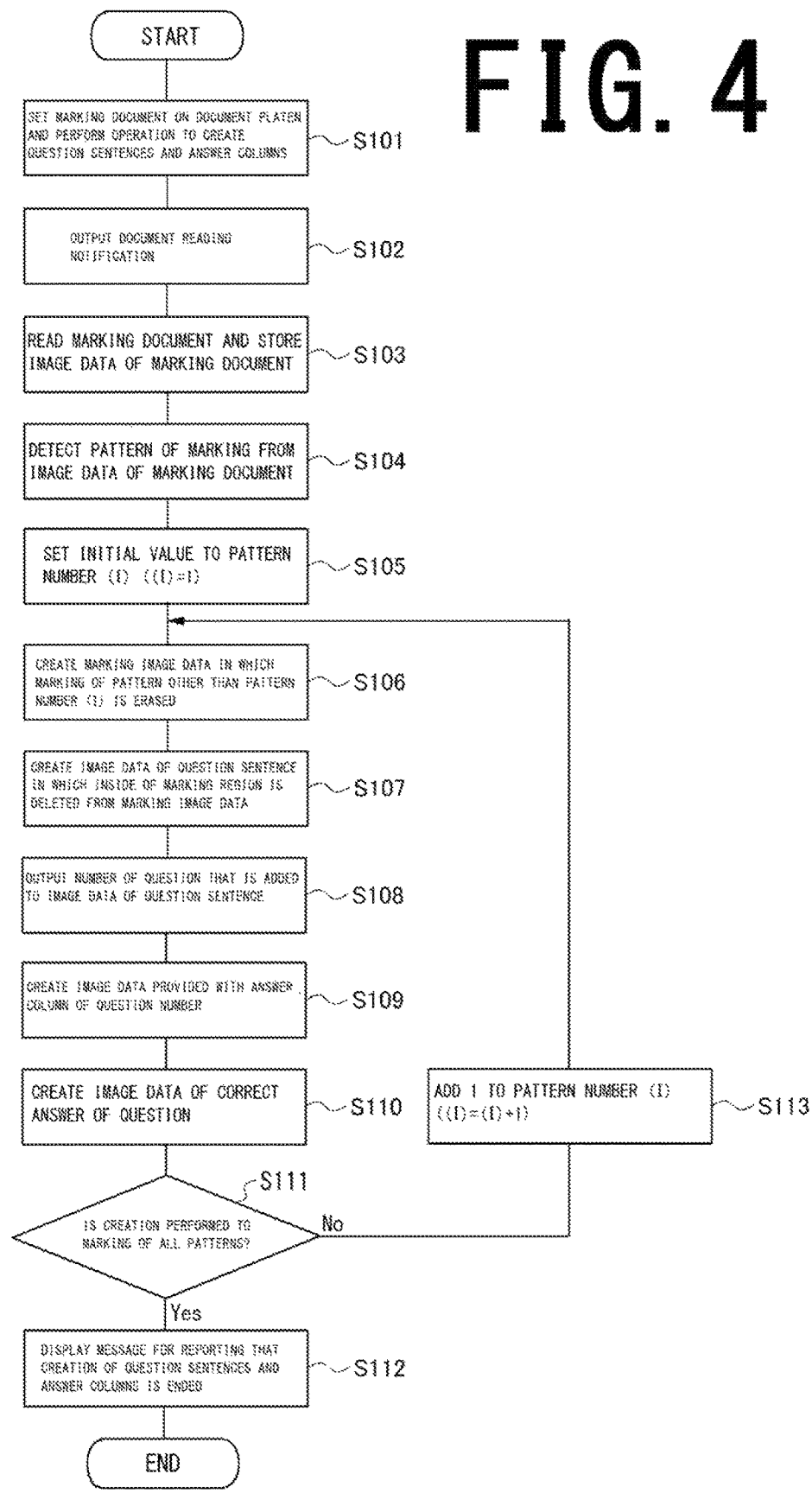
FIG. 4 is a flowchart illustrating a process to create a question sentence and answer column having a plurality of patterns from one document according to the first embodiment of the present disclosure.

Subsequently, details of the process to create the question sentences and answer columns of a plurality of patterns from one document by using the image forming apparatus 100 according to the embodiment 1 of the present disclosure will be described in the order of steps with reference to a flowchart of FIG. 4.

(Step S101)

First, the user sets on the document platen the marking document 800 to which the marking of the plurality of patterns illustrated in FIG. 2 (i) has been applied, and performs, from the operation panel 104, an operation to create the question sentences and answer columns.

(Step S102)

Next, when it is detected that the operation to create the question sentences and answer columns is performed by the operation panel processing unit 105, the control unit 101 outputs a document reading notification to the document reading processing unit 101*a*.

(Step S103)

Next, when the document reading notification is input, the document reading processing unit 101*a* reads the marking document 800 illustrated in FIG. 2 (i) by the scanner unit 106. Further, when the image data of the read marking document 800 is input from the image processing unit 107, the document reading processing unit 101*a* stores the image data of the marking document 800 in the marking document image data storage area 102*a*. Further, the document reading processing unit 101*a* outputs a marking pattern detection notification to the marking pattern detection processing unit 101*b*.

(Step S104)

Next, when the marking pattern detection notification is input, the marking pattern detection processing unit 101*b* takes out the image data of the marking document 800 from the marking document image data storage area 102*a* and recognizes, in each different pattern, the marking in the marking region to which the marking of the image data of the marking document 800 has been applied, thereby detecting the patterns of the marking. For example, when the marking of two different patterns has been applied as in the marking document 800 illustrated in FIG. 2 (i), two patterns of patterns 1 and 2 are detected. Then, the marking pattern detection processing unit 101*b* outputs a question sentence creation notification to the question sentence creation processing unit 101*c*.

(Step S105)

Next, when the question sentence creation notification is input, the question sentence creation processing unit 101*c* sets an initial value "1" to a pattern number (I).

(Step S106)

Next, the question sentence creation processing unit 101*c* takes out the imaging data of the marking document 800 from the marking document image data storage area 102*a* and erases marking of patterns other than the pattern number (I) from the image data of the marking document 800. For example, when the pattern number (I) is "1" and the marking document 800 illustrated in FIG. 2 (i) is used, the marking image 810 of pattern 1 illustrated in FIG. 2 (ii) is created in which the marking of pattern 2 is erased.

(Step S107)

Next, the question sentence creation processing unit 101*c* deletes all the partial image data in the marking region of the pattern number (I) from the marking image data. Then, when image data of the question sentence to which the question number is added is created in a blank portion due to deletion of the title and the partial image data, the question sentence creation processing unit 101*c* stores the above image data in the question sentence image data storage area 102*b*. For example, when the pattern number (I) is "1" and the marking image 810 of pattern 1 illustrated in FIG. 2 (ii) is used, the image 811 of the question sentence of pattern 1 illustrated in FIG. 2 (iii) to which the question numbers of [1] and [2] are added is created in a blank portion in which the title "question" and the character strings 801*a* and 801*b* are deleted.

(Step S108)

Next, the question sentence creation processing unit 101c outputs to the answer column creation processing unit 101d the number of the question that is added to the image data of the question sentence.

(Step S109)

Next, when the number of the question that is added to the image data of the question sentence is input, the answer column creation processing unit 101d creates the image data that is provided with the answer column to the question number, and stores the above image data in the answer column image data storage area 102c. For example, when the pattern number (I) is "1" and the image 811 of the question sentence of pattern 1 is used to which the question numbers [1] and [2] illustrated in FIG. 2 (iii) are added, the image 812 of answer columns of pattern 1 is created that is provided with the answer columns to the question numbers [1] and [2] illustrated in FIG. 2 (iv). Then, the answer column creation processing unit 101d outputs the question numbers to the correct-answer extraction processing unit 101e.

(Step S110)

Next, when the question numbers are input, the correct-answer extraction processing unit 101e takes out the image data of the marking document 800 from the marking document image data storage area 102a, and extracts the partial image data of the pattern number (I) in the marking region from the image data of the marking document 800. Next, the correct-answer extraction processing unit 101e creates the image data of correct answers of the questions by using the partial image data and the input question numbers, and stores the image data of the correct answers of the questions in the question answer image data storage area 102d. For example, when the pattern number (I) is "1" and the character strings 801a and 801b are extracted from the marking image 810 of pattern 1 illustrated in FIG. 2 (ii), the image data of the correct answers is created by the question numbers [1] and [2] illustrated in FIG. 2 (v) and the character strings 801a and 801b. Then, the correct-answer extraction processing unit 101e outputs a correct-answer extraction end notification to the question sentence creation processing unit 101c.

(Step S111)

Next, when the correct-answer extraction end notification is input, the question sentence creation processing unit 101c determines whether the question sentences and answer columns are created with regard to the marking of all the patterns. If the question sentences and answer columns are created with regard to the marking of all the patterns (Yes in step S111), the process advances to step S112. If the question sentences and answer columns are not created with regard to the marking of all the patterns (No in step S111), the process proceeds to step S113.

(Step S112)

In Yes of step S111, the question sentence creation processing unit 101c displays, on the operation panel 104 by the operation panel processing unit 105, a message for reporting that the creation of the question sentences and answer columns is ended.

(Step S113)

In No of step S111, when the question sentence creation processing unit 101c adds "1" to the pattern number (I), the process then returns to step S106.

The image data of the question sentences created as described above is stored in the question sentence image data storage area 102b, while the image data of the answer columns is stored in the answer column image data storage area 102c. Therefore, it is possible for the user to print on sheets the created question sentences and answer columns as much as the required number of copies by the printing unit 108.

Figure 5:
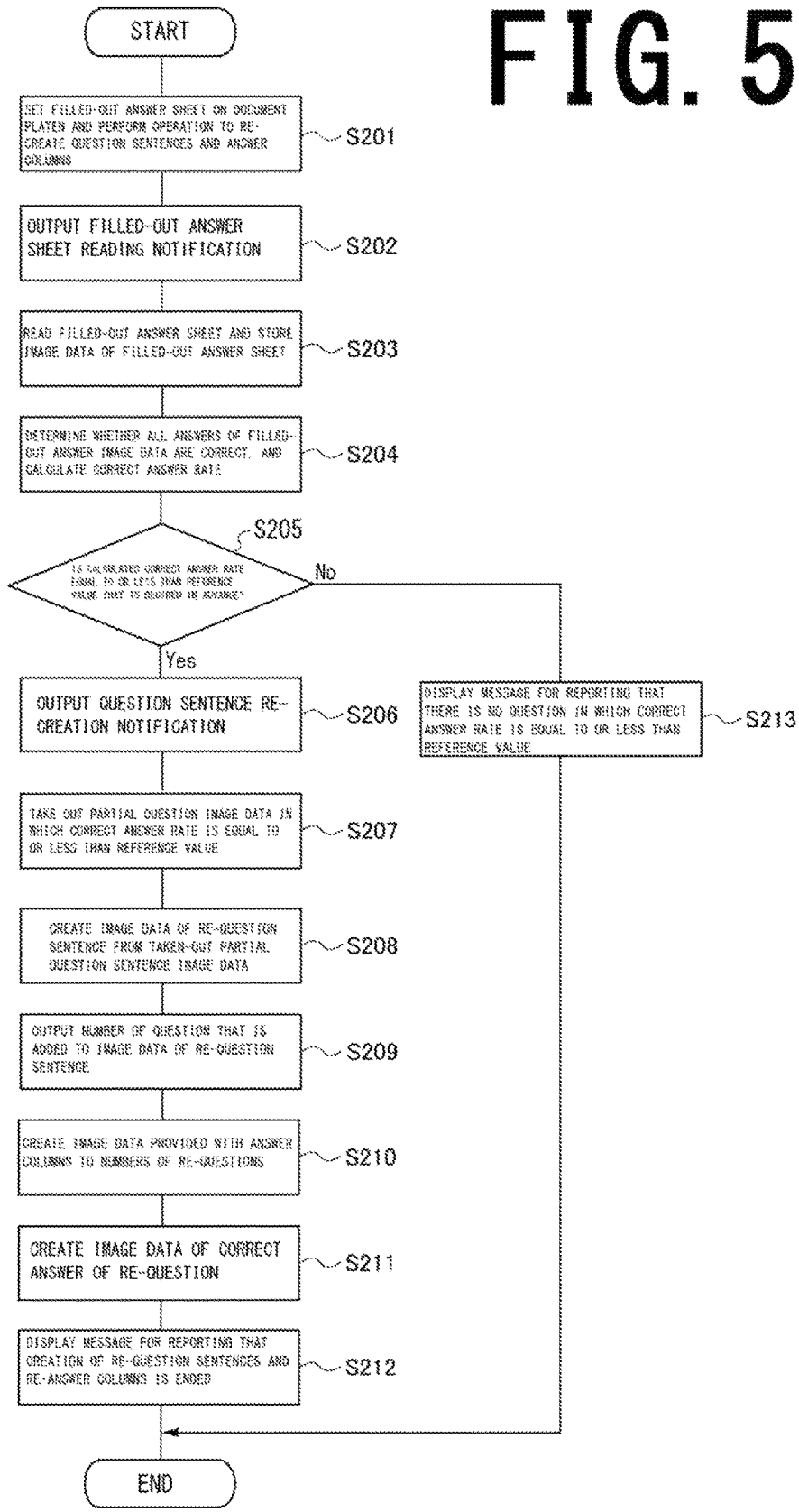
FIG. 5 is a flowchart illustrating a process to re-create the question sentence and answer column according to the first embodiment of the present disclosure.

Subsequently, details of the process to re-create the question sentences and answer columns by the image forming apparatus 100 will be described in the order of steps with reference to a flowchart of FIG. 5.

(Step S201)

Figure 3:
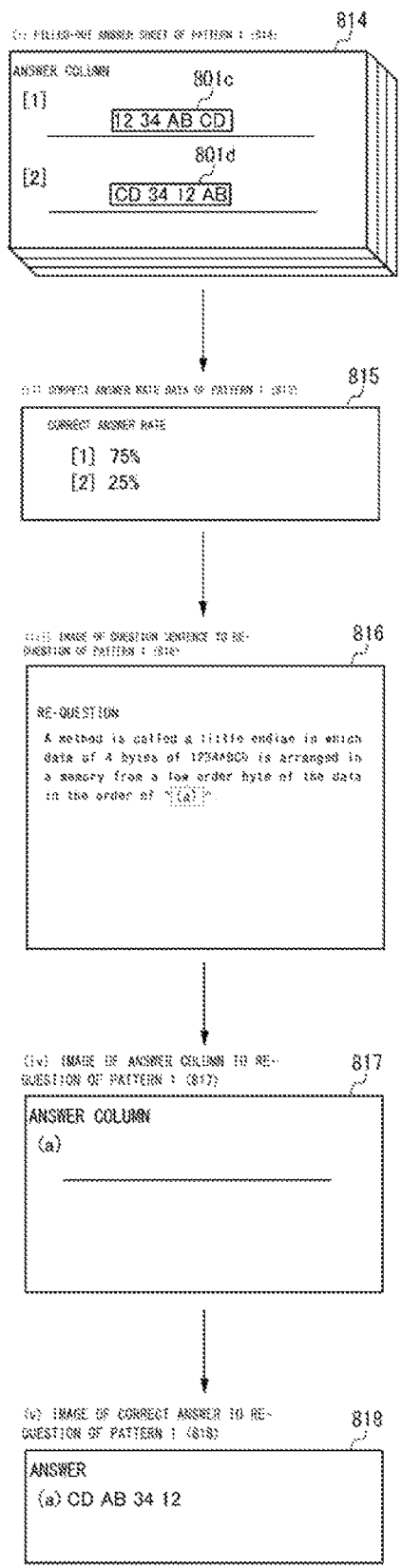
FIG. 3 is a flowchart illustrating a procedure to re-create a question sentence and answer column according to the first embodiment of the present disclosure.

First, the user sets on the document platen the filled-out answer sheets 814 of pattern 1 illustrated in FIG. 3 (i) and performs from the operation panel 104 an operation to re-create the question sentences and answer columns.

(Step S202)

Next, when it is detected that the operation to re-create the question sentences and answer columns is performed by the operation panel processing unit 105, the control unit 101 outputs the filled-out answer sheet reading notification to the filled-out answer sheet reading processing unit 101f.

(Step S203)

Next, when the filled-out answer sheet reading notification is input, the filled-out answer sheet reading processing unit 101f reads the filled-out answer sheets 814 of pattern 1 illustrated in FIG. 3 (i). Further, when the read image data is input from the image processing unit 107, the filled-out answer sheet reading processing unit 101f stores the image data of the filled-out answer sheets 814 of pattern 1 in the filled-out answer sheet image data storage area 102e. Then, the filled-out answer sheet reading processing unit 101f outputs a correct-answer-rate calculation notification to the correct-answer-rate calculation processing unit 101g.

(Step S204)

Next, when the correct-answer-rate calculation notification is input, the correct-answer-rate calculation processing unit 101g takes out filled-out answer image data (hereinafter, referred to as "filled-out answer image data") from the filled-out answer sheet image data storage area 102e and determines whether answers of the filled-out answer image data are correct, so that correct answer rates to the filled-out answer image data are calculated. Suppose, for example, that the number of pieces of the filled-out answer image data is 40 in each of the question numbers [1] and [2], the number of the correct answers of the question number [1] is 30, and that of the question number [2] is 10. In this case, in the correct answer rate data of pattern 1, the correct answer rate of the question number [1] is 75% and that of the question number [2] is 25%, as illustrated in FIG. 3 (ii).

(Step S205)

Next, the correct-answer-rate calculation processing unit 101g determines whether the calculated correct answer rate is equal to or less than the reference value that is decided in advance. If the calculated correct answer rate is equal to or less than the reference value that is decided in advance (Yes in step S205), the process advances to step S206. If the calculated correct answer rate is not equal to or less than the reference value that is decided in advance (No in step S205), the process proceeds to step S213.

(Step S206)

In Yes of step S205, the correct-answer-rate calculation processing unit 101g outputs a question sentence re-creation notification to the question sentence re-creation processing unit 101h.

(Step S207)

Next, when the question sentence re-creation notification is input, the question sentence re-creation processing unit 101h inputs question sentence image data from the question sentence image data storage area 102b, and takes out from the question sentence image data the partial question sentence image data in which the correct answer rate is equal to or less than the reference value that is decided in advance. For example, when the reference value is set to 50%, the correct answer rate of the question number [2] is 25% of the reference value or less, and therefore the partial question sentence image data of question (B) to the question number [2] is taken out from the question sentence image data illustrated in FIG. 2 (iii).

(Step S208)

Next, when the image data of a re-question sentence to which the number of a new question is added is created in a portion to which the number of the question of the partial question sentence image data is added, the question sentence re-creation processing unit 101h stores the above image data in the re-question sentence image data storage area 102f. For example, the image 816 of question sentence to re-question of pattern 1 illustrated in FIG. 3 (iii) is created to which the number (a) of a new question is added.

(Step S209)

Next, the question sentence re-creation processing unit 101h outputs to the answer column re-creation processing unit 101i the number of the question that is added to the image data of the re-question sentence.

(Step S210)

Next, when the number of the question that is added to the image data of the re-question sentence is input, the answer column re-creation processing unit 101i creates the image data that is provided with the answer columns to the numbers of the re-questions, and stores the above image data in the re-answer column image data storage area 102g. For example, when the image 816 of question sentence to re-question of pattern 1 is used to which the number (a) of the question illustrated in FIG. 3 (iii) is added, the image 817 is created that is provided with an answer column to the number (a) of the question corresponding to the re-question of pattern 1 illustrated in FIG. 3 (iv). Then, the answer column re-creation processing unit 101i outputs the number of the question to the correct-answer re-extraction processing unit 101j.

(Step S211)

Next, when the number of the question is input, the correct-answer re-extraction processing unit 101j takes out the question correct-answer image data from the question correct-answer image data storage area 102d, and extracts the partial image data corresponding to the re-question from the question correct-answer image data. Next, the correct-answer re-extraction processing unit 101j creates the image data of a correct answer to the re-question by the extracted partial image data and the number of the input question, and stores the image data of the correct answer to the re-question in the re-question answer image data storage area 102h. For example, when the pattern number (I) is "1" and the partial image data of the question number [2] in the image 813 of correct answer of pattern 1 illustrated in FIG. 2 (v) is extracted, the image data of the correct answer is created by the number [2] of the question illustrated in FIG. 3 (v) and the partial image data. Then, the correct-answer re-extraction processing unit 101j outputs a correct-answer re-extraction end notification to the question sentence re-creation processing unit 101h.

(Step S212)

Next, when the correct-answer re-extraction end notification is input, the question sentence re-creation processing unit 101h displays, on the operation panel 104 by the operation panel processing unit 105, a message for reporting that the re-creation of the question sentences and answer columns is ended.

(Step S213)

In No of step S205, the correct-answer-rate calculation processing unit 101g displays, on the operation panel 104 by the operation panel processing unit 105, a message for reporting that there is no question in which the correct answer rate is equal to or less than the reference value that is decided in advance.

The image data of the question sentences re-created as described above is stored in the re-question sentence image data storage area 102f, while the image data of the re-created answer columns is stored in the re-answer column image data storage area 102g. Therefore, it is possible for the user to print on sheets the re-created question sentences and answer columns as much as the required number of copies by the printing unit 108.

According to the embodiment 1 described above, the marking of a plurality of patterns is performed on a document, and thereby it is possible to create the question sentences and answer columns of the plurality of patterns. Further, the created question sentences and answer columns are used to perform a test and the correct answer rate is calculated in each question, and thereby it is unnecessary for the user to perform the marking on a document again and it is possible to re-create the question sentences and answer columns in which only the questions are collected whose correct answer rate is equal to or less than the reference value that is decided in advance.

Subsequently, a second embodiment (hereinafter, referred to as an "embodiment 2") for embodying the disclosure will be described with reference to the accompanying drawings. In the embodiment 2, a document is read in which markings and frames on the markings are filled out, and question sentences and answer columns are created. A procedure to create the question sentences and answer columns according to the embodiment 2 will be described with reference to FIG. 6.

Figure 6:
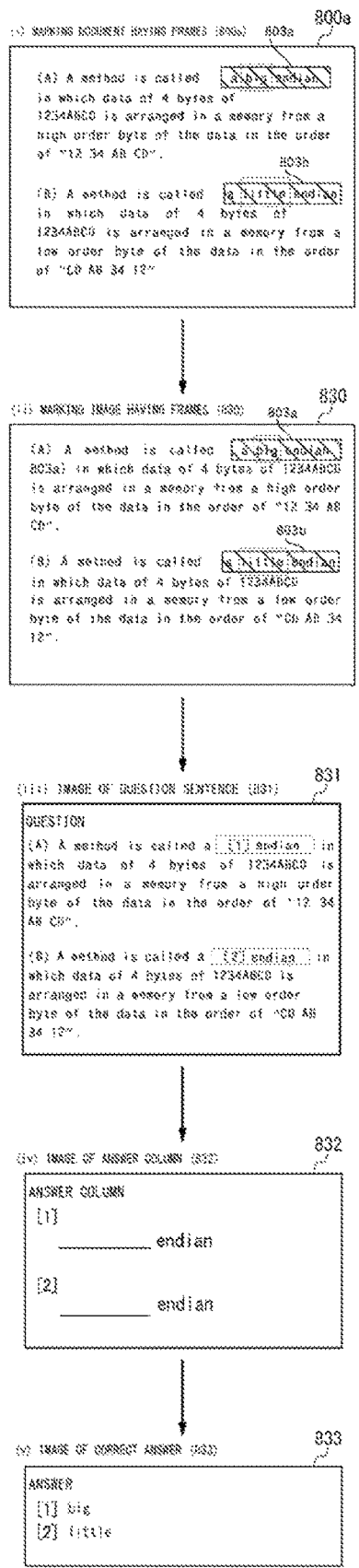
FIG. 6 is a flowchart illustrating a procedure to create a question sentence and an answer column from a document according to a second embodiment of the present disclosure.

First, as illustrated in FIG. 6 (i), the user creates a document (hereinafter, referred to as a "marking document having frames") 800a in which character strings 803a and 803b are marked and part of the character strings 803a and 803b are surrounded by frames. Next, the user sets the marking document 800a having frames on a document platen and performs an operation to create question sentences and answer columns, so that the marking document 800a having frames is read.

Next, a marking image 830 having frames illustrated in FIG. 6 (ii) is created from the read marking document 800a having frames. Next, an image 831 of question sentences illustrated in FIG. 6 (iii) is created in which the character strings of frame portions and the markings are deleted from the marking image 830 having frames and the numbers [1] and [2] of the questions are added to blank areas of the deleted character strings. Next, an image 832 of answer columns illustrated in FIG. 6 (iv) is created in which there are the answer columns in which only the frame portions of the character strings marked to the numbers [1] and [2] of the added questions are blank. Next, an image 833 of correct answers illustrated in FIG. 6 (v) is created by using the character strings of the frame portions deleted from the marking image 830 having frames.

According to the embodiment 2 described above, the marking is performed on the document and part of the marked character strings are surrounded by the frames, thereby creating the question sentences and answer columns of the questions in which only the portions surrounded by the frames are blank. Further, the marked character strings that are not surrounded by the frames are a key for solving the questions, so that the question sentences and answer columns of the questions with a low difficulty level are created.

Subsequently, a third embodiment (hereinafter, referred to as an "embodiment 3") for embodying the present disclosure will be described with reference to the accompanying drawings. In the embodiment 3, a document is read in which markings, frames on the markings, and underlines are filled out, and question sentences and answer columns having two patterns are created. A procedure to create the question sentences and answer columns according to the embodiment 3 will be described with reference to FIG. 7.

Figure 7:
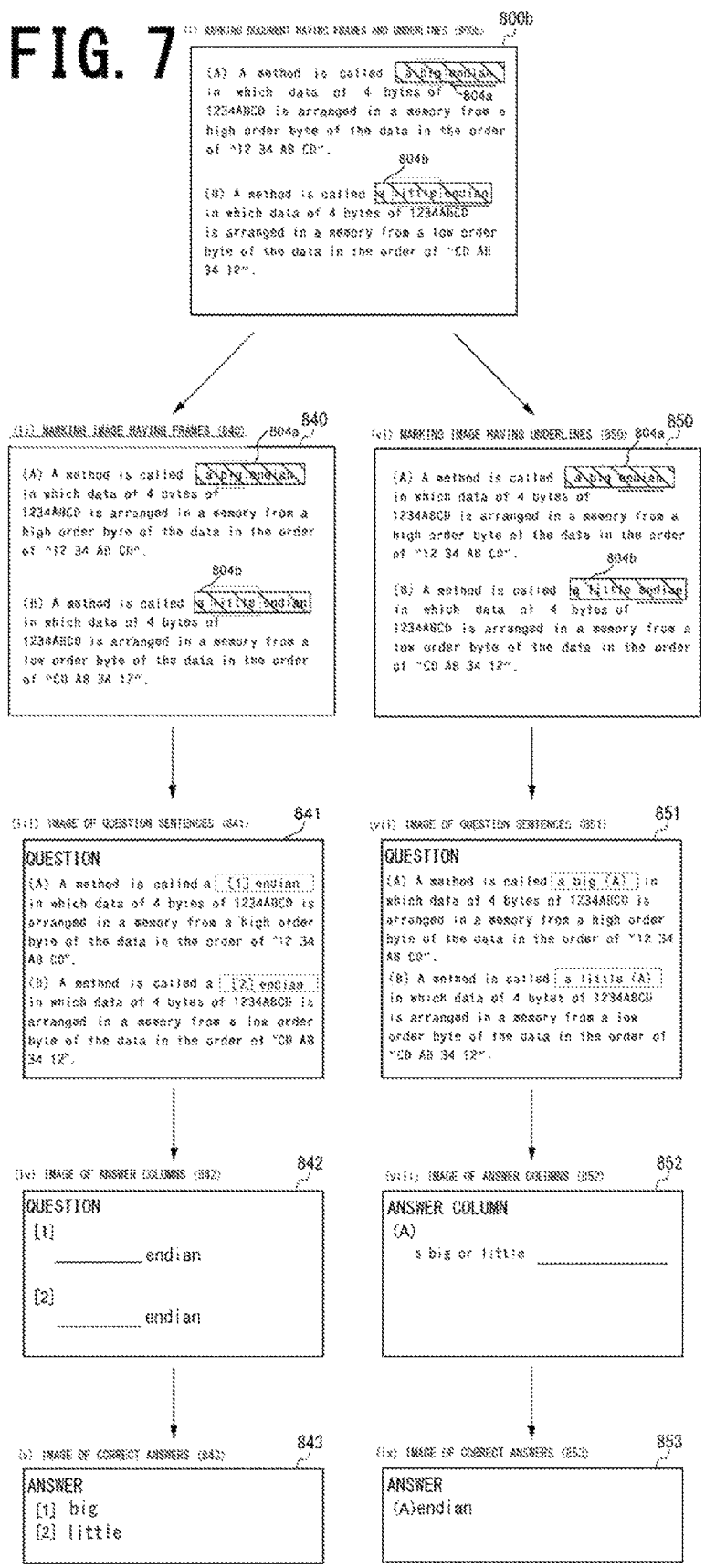
FIG. 7 is a flowchart illustrating a procedure to create a question sentence and answer column having two patterns from one document according to a third embodiment of the present disclosure.

First, as illustrated in FIG. 7 (i), the user creates a document (hereinafter, referred to as a "marking document having frames and underlines") 800*b* in which character strings 804*a* and 804*b* are marked, part of the character strings 804*a* and 804*b* are surrounded by the frames, and further part of the character strings 804*a* and 804*b* are underlined. Next, the user sets on a document platen the marking document 800*b* having frames and underlines and performs an operation to create question sentences and answer columns, so that the marking document 800*b* having frames and underlines is read.

Next, a marking image 840 having frames, which has only the frames and markings, illustrated in FIG. 7 (ii) is created from the read marking document 800*b* having frames and underlines. Next, an image 841 of question sentences illustrated in FIG. 7 (iii) is created in which character strings of frame portions are deleted from the marking image 840 having frames, and the numbers [1] and [2] of the questions are added to blank areas of the deleted character strings. Next, an image 842 of answer columns illustrated in FIG. 7 (iv) is created in which there are the answer columns in which only the frame portions of the character strings marked to the numbers [1] and [2] of the added questions are blank. Next, an image 843 of correct answers illustrated in FIG. 7 (v) is created by using the character strings of the frame portions deleted from the marking image 840 having frames.

Next, a marking image 850 having underlines illustrated in FIG. 7 (vi) in which there are only underlines and markings is created from the read marking document 800*b* having frames and underlines. Next, an image 851 of question sentences illustrated in FIG. 7 (vii) is created from the marking image 850 having underlines, in which the character strings of underlined portions are deleted and the number (A) of the questions is added to blank areas of the deleted character strings. Next, an image 852 of answer columns illustrated in FIG. 7 (viii) is created in which there are the answer columns in which only the underlined portions of the character strings marked to the added number [A] of the questions are blank. Next, an image 853 of correct answers illustrated in FIG. 7 (ix) is created by using the character strings of the underlined portions deleted from the marking image 850 having underlines.

According to the embodiment 3 described above, the marking is performed on the document, part of the marked character strings are surrounded by the frames, or part of the marked character strings are underlined, thereby creating the question sentences and answer columns of the questions in which only the portions surrounded by the frames are blanked or only the underlined portions are blanked. Further, the marked character strings that are not surrounded by the frames and those that are not underlined are a key for solving the questions, so that the question sentences and answer columns of the questions with a low difficulty level are created.

In a typical technique, by performing marking on a question document, it is possible to create a question sheet and an answer sheet and perform a test; however, it is difficult to create a plurality of question sheets and answer sheets of questions different from the question document. Further, there is a problem that when question sheets and answer sheets are re-created from the same question document based on results of the test, the marking ought to be performed on the question document again, and therefore a lot of trouble is taken.

The information processing apparatus according to the present disclosure creates an image of a plurality of question sentences and answer columns from a document and performs a test by using sheets in which the images of the created question sentences and answer columns are printed. Further, based on the results, it is possible for the information processing apparatus to easily re-create an image of question sentences and answer columns from the same document.

In the embodiment, the marking document 800 is set on the document platen of the image forming apparatus 100 and an operation to create the question sentences and answer columns is performed from the operation panel 104, but it is not limited thereto. For example, it is possible to receive the image data of the marking document 800 via the network 200 from other image forming apparatuses 300, terminal devices 400, or mobile terminals 600, and also it is possible to create the question sentences and answer columns from the above image data. In the same way, the filled-out answer sheet 814 of pattern 1 is set on the document platen of the image forming apparatus 100 and an operation to re-create the question sentences and answer columns is performed from the operation panel 104, but it is not limited thereto. For example, it is possible to receive the image data of the filled-out answer sheet 814 of pattern 1 via the network 200 from other image forming apparatuses 300, terminal devices 400, or mobile terminals 600, and also it is possible to re-create the question sentences and answer columns from the above image data.

Further, in the embodiment, the image data of the question sentences and that of the answer columns as well as the image data of the re-question sentences and that of the answer columns are created. However, it is possible to create only the image data of the question sentences as well as that of the re-question sentences without creating the image data of the answer columns.

Further, in the embodiment 2, the document is used in which the frames are filled out on the markings, and further, in the embodiment 3, the document is used in which the frames and underlines are filled out on the markings, but the frames and underlines on the markings are not limited thereto. When it is possible to clarify a range with respect to the character string on the marking, any identifier may be used and also the number of the identifiers may be equal to or more than two.

Further, in the embodiment, the scanner unit 106 reads answers that have been filled out in the filled-out answer sheet 814 of pattern 1; however, since the filled-out answers are written by hand, characters may be incapable of being recognized or may be mistakenly recognized in an OCR function of the scanner unit 106. In such a case, the scanner unit 106 is provided with an OCR function capable of correcting characters, thereby reading characters correctly.

Further, in the embodiment, it is possible to store in the memory unit 102 a correct answer rate for each question of the question sentences calculated by the correct-answer-rate calculation processing unit 101g. The process permits the correct answer rate for each question of the question sentences to be listed and printed out.

The information processing apparatus of the present disclosure creates an image of a plurality of question sentences and answer columns from a document and performs a test by using sheets in which the image of the created question sentences and answer columns is printed out. Further, based on the results, it is possible for the information processing apparatus to easily re-create the image of the question sentences and answer columns from the same document.

As described above, the present disclosure is described by using specific embodiments and the above embodiments are illustrative of the present disclosure, of course, not limited to this embodiment.

The present disclosure is generally applicable to an apparatus having an OCR function.

What is claimed is:

1. An information processing apparatus comprising:
   a document reading unit that:
      uses a scanner to read a document to which a marking has been applied by a first pattern to a plurality of character strings of the document to provide a plurality of marking regions each comprising a respective character string, wherein a portion of the character string of each of the plurality of marking regions is additionally marked by a first identifier comprising an underline or a frame; and
      acquires document image data from the read document;
   a marking pattern detection unit that recognizes, in each of the plurality of marking regions, a) the marking, b) the additional marking, c) the character string marked by the marking, and d) the portion of the character string additionally marked by the first identifier;
   a question sentence creation unit that creates, for each of the marking regions, question sentence image data in which:
      the portion of each of the marked character strings that was additionally marked by the first identifier is deleted from the document image data;
      a portion of each of the marked character strings that was not additionally marked by the first identifier is not deleted from the document image data;
      each of the markings is deleted;
      each of the additional markings by the first identifier is deleted; and
      each of the deleted portions is marked with a question number corresponding to a question order number, thereby providing a plurality of numbers;
   an answer column creation unit that creates, for each of the question sentence image data, answer column image data comprising, for each of the question numbers:
      the respective question number;
      a blank; and
      the portion of the respective marked character string that is not additionally marked, without showing the portion of the respective marked character string that was additionally marked;
   a correct-answer extraction unit that creates, for each of the question sentence image data, correct answer image data comprising, for each of the question numbers:
      the respective question number; and
      the portion of the respective marked character string that was additionally marked; and
   a printer that prints the question sentence image data created by the question sentence creation unit and the answer column image data created by the answer column creation unit.

2. The information processing apparatus according to claim 1, further comprising:
   a filled-out answer sheet reading unit that reads a filled-out answer sheet in which an answer has been filled out and acquires answer image data;
   a correct-answer-rate calculation unit that determines whether an answer of the answer image data is correct based on the correct-answer image data and calculates a correct answer rate for each question of the question sentence image data; and
   a question sentence re-creation unit that creates re-question sentence image data from the question in which the correct answer rate taken out from the question sentence image data is equal to or less than a reference value that is decided in advance.

3. The information processing apparatus according to claim 2, further comprising an answer column re-creation unit that creates the answer column image data of a re-question provided with an answer column of the re-question of the re-question sentence image data.

4. The information processing apparatus according to claim 1, wherein:
   the document read comprises a first character string having marking applied by a pattern,
   a first portion of the first character string is additionally marked by the first identifier,
   a second portion of the first character string is additionally marked by a second identifier different than the first identifier,
   the first portion is different than the second portion,
   the question sentence creation unit creates a first question sentence image data in which:
      the first portion is deleted from the document image data;
      the second portion is not deleted from the document image data; and
      the deleted first portion is marked with a question number corresponding to a question order number; and
   the question sentence creation unit creates a second question sentence image data in which:
      the second portion is deleted from the document image data;
      the first portion is not deleted from the document image data; and
      the deleted second portion is marked with a question number corresponding to a question order number.

5. The information processing apparatus according to claim 4, wherein the first identifier and the second identifier are different members of the group consisting of an underline and a frame.

* * * * *